United States Patent [19]

Mifsud

[11] 4,108,270
[45] Aug. 22, 1978

[54] HYDRAULIC STABILIZATION SYSTEM TO POSITION AND ISOLATE A SEISMIC VIBRATOR

[75] Inventor: Joseph F. Mifsud, Houston, Tex.

[73] Assignee: Exxon Production Research Company, Houston, Tex.

[21] Appl. No.: 767,181

[22] Filed: Feb. 9, 1977

[51] Int. Cl.² .............................................. G01V 1/14
[52] U.S. Cl. ..................... 181/114; 181/121; 181/401; 248/20; 280/689; 280/112 A
[58] Field of Search ........... 181/114, 401, 121; 340/17, 85; 248/20; 280/6 H, 689, 112 A, 703; 73/71.7

[56] References Cited

U.S. PATENT DOCUMENTS

| | | | |
|---|---|---|---|
| 2,124,124 | 7/1938 | Schoepf et al. | 280/112 A |
| 3,353,772 | 11/1967 | Fair et al. | 248/20 |
| 3,572,746 | 3/1971 | Mueller | 280/6 H |
| 3,690,402 | 9/1972 | Stafford | 181/114 |
| 3,752,497 | 8/1973 | Enke et al. | 280/112 A |
| 3,885,809 | 5/1975 | Pitcher | 280/112 A |
| 3,980,316 | 9/1976 | Yates | 280/112 A |
| 4,011,923 | 3/1977 | Talke et al. | 181/114 |
| 4,056,164 | 11/1977 | Johnston | 181/114 |

Primary Examiner—Nelson Moskowitz
Attorney, Agent, or Firm—E. Eugene Thigpen

[57] ABSTRACT

A hydraulic stabilization system which comprises pairs of hydraulic cylinders in fluid communication connected between the vehicle support structure of the vibrator and the vibrator ground coupling plate. This configuration maintains the ground coupling plate in vertical aligment with the vehicle support structure and isolates vibratory motions of the ground coupling plate from the vehicle support structure.

15 Claims, 5 Drawing Figures

HYDRAULIC STABILIZATION SYSTEM TO POSITION AND ISOLATE A SEISMIC VIBRATOR

BACKGROUND OF THE INVENTION

1. Field of the Invention

The present invention relates to vibratory seismic energy sources used for seismic prospecting. More particularly, it relates to a system for maintaining the relative position of the ground coupling plate of a seismic vibrator in the horizontal plane.

2. Description of the Prior Art

In seismic prospecting, it has become common to use, as a seismic wave source, an electrohydraulically controlled vibratory source, more simply referred to as a vibrator.

Typically, a vibrator comprises a double ended piston rigidly affixed to a coaxial piston rod. The piston is located in reciprocating relationship in a cylinder formed within a heavy reaction mass. Means are included for alternately introducing hydraulic fluid under high pressure to opposite ends of the cylinder, thereby imparting a reciprocating motion to the piston relative to the reaction mass. The piston rod extending from the reaction mass is rigidly coupled to a ground coupling plate (hereinafter baseplate) which is maintained in intimate contact with the earth material. The inertia of the reaction mass tends to resist displacement of the reaction mass relative to the earth. The motion of the piston is coupled through the piston rod and baseplate to impart vibratory seismic energy in the earth.

Typically, a vibrator is vehicle mounted, and to prevent decoupling of the baseplate from the ground during operation, a portion of the vehicle's weight is applied to the baseplate. The weight of the vehicle is frequently applied to the baseplate through one or more spring members so that a static bias force is imposed on the baseplate while the dynamic forces of the baseplate are decoupled from the vehicle. A support structure which rests atop the spring members supports the weight of the vehicle.

These spring members, usually in the form of air bags, may have little resistance to lateral stress. It is therefore necessary to employ a system to assure that the baseplate is maintained in vertical alignment with the vehicle. This horizontal stabilization should not interfere with or detract from, to any appreciable extent, the desired vibratory motion of the baseplate.

It is known in the art to use for this purpose a plurality of radius rods (see U.S. Pat. No. 3,690,402, issued Sept. 12, 1972). The radius rods extend both transversely and longitudinally and are connected generally in the horizontal plane with one end pivotally attached to the baseplate and the other end pivotally attached to the support structure. As the vibrator baseplate moves vertically, the radius rods do induce some horizontal displacement between the baseplate and the support structure. This horizontal displacement is, to a certain extent, taken up by rubber bushings in the eye ends of the radius rods. A portion of this induced horizontal motion, as well as other horizontal motion generated by interaction of the ground and the baseplate, is transmitted by the radius rods to the support structure and to the transport vehicle.

Another stabilization system, employing a Watt's Linkage, is comprised of two rods and a rotating center link. An end of each rod may be connected to the baseplate. The other end of each rod is connected to the rotating center link, which is pivotally connected to the support structure. The center link rotates freely about this pivotal connection and the two rods rotate freely about connections to opposing ends of the center link. The ends of the rods connected to the baseplate are also rotationally free. One of these structures is normally affixed to each side of the vibrator baseplate.

The Watt's Linkage system induces significantly less horizontal displacement of the baseplate resulting from vertical baseplate motion, than does the radius rods. Both the Watt's Linkage system and radius rods, however, may transmit undesirable vibrations from the baseplate to the support structure and transport vehicle, which may cause damage to the vehicle.

SUMMARY OF THE INVENTION

Apparatus is disclosed which maintains alignment between the vibrator baseplate and the support structure for the transport vehicle. The alignment apparatus is pivotally connected to the baseplate and the support structure for the vehicle weight. Baseplate vibrations are isolated from the transport vehicle by utilizing resilient means for interconnecting the portion of the apparatus connected to the baseplate with the portion of the apparatus connected to the support structure.

In a preferred embodiment, the alignment means may comprise a plurality of pairs of piston-cylinder assemblies, with the cylinders connected to the support structure and the pistons connected to the baseplate, or vice versa. The piston separates the cylinder into two chambers, and nonanalogous chambers of each pair of cylinders are connected in fluid communication by conduits therebetween. Either the connections to the baseplate or to the support structures are widely spaced apart in comparison to the other connections. Both chambers of the cylinder and the conduits are filled with hydraulic fluid. The baseplate is maintained in vertical alignment with the support structure, and vertical motion of the baseplate at the vibrating frequencies of interest is enabled.

The hydraulic fluid will have a certain amount of compliance and this compliance functions to isolate vibratory motion of the baseplate from the support structure and the vehicle.

DESCRIPTION OF THE PREFERRED EMBODIMENT

Figure 1:
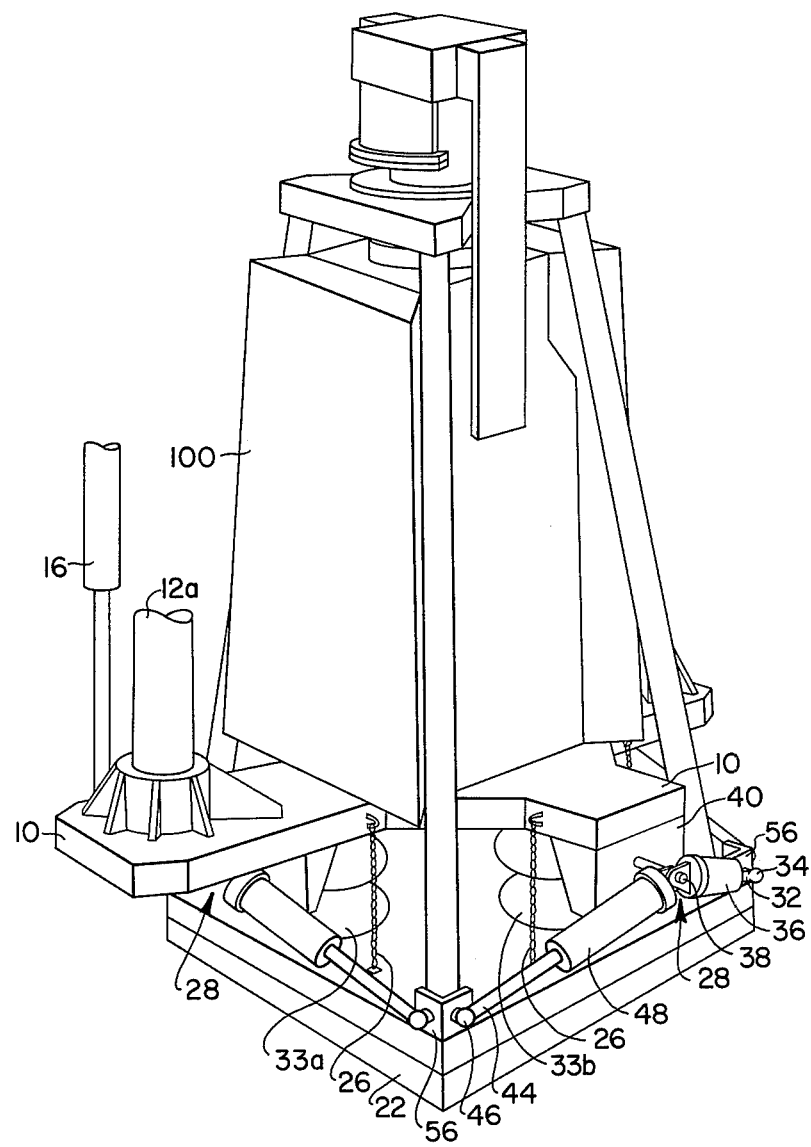
FIG. 1 is a perspective view of a type of vibrator.

FIG. 1 shows baseplate 22 of a seismic vibrator. The vibrator may be of a type known to those familiar with the prior art; therefore, many details of the structure thereof are not included in the drawing. Normally, however, the baseplate is driven by a hydraulic drive mechanism comprising a driving piston reciprocably mounted within a cylinder bore, and a piston rod. The lower end of the piston rod is affixed to the center of the baseplate.

Figure 4:
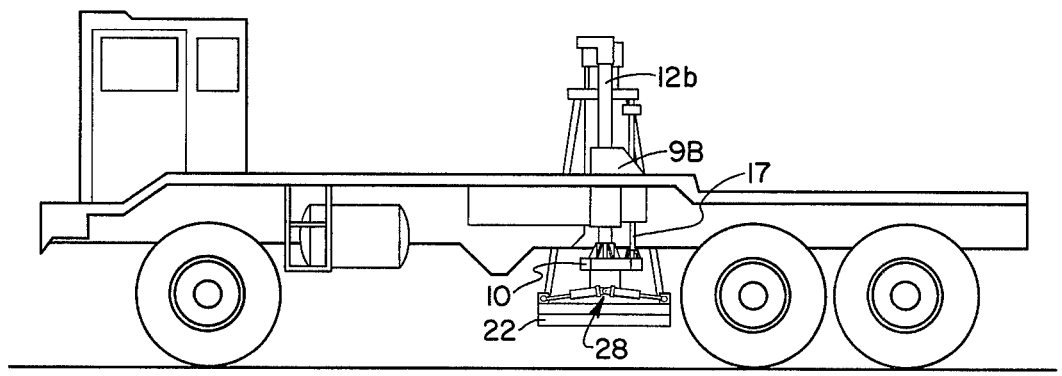
FIG. 4 illustrates a vibrator mounted on a vehicle.

Hydraulic lift cylinders 16 and 17 (see FIGS. 1 and 4) transfer the weight of the vehicle to a support structure, such as hold-down plate 10. Hold-down plate 10 extends beneath reaction mass 100 and rests upon four air bags 33a, 33b, 33c, and 33d (the latter two not shown in FIG. 1), which are affixed between the hold-down plate and the baseplate. The air bags may preferably be spaced at regular intervals around the baseplate to couple the load of the vehicle to the baseplate evenly. The vibrator piston rod extends through the center portion of the hold-down plate which has a cut-out section for that purpose.

Hydraulic lift cylinders 16 and 17 (see FIGS. 1 and 4) control the vertical position of the vibrator relative to the vehicle. The cylinder housings of lift cylinders 16 and 17 are affixed to the vehicle frame and the piston rods thereof are affixed to the hold-down plate. When hydraulic fluid is pumped into the upper portion of lift cylinders 16 and 17, the pistons are forced down relative to the cylinders and the vibrator is lowered to the ground. After the baseplate is lowered to the earth's surface, if additional hydraulic fluid is pumped into the upper portion of lift cylinders 16 and 17, the vehicle will be lifted off the ground and its weight will bear on the hold-down plate thus applying the weight of a heavy mass to the baseplate. The air bags which connect the hold-down plate with the baseplate transmit the weight of the vehicle to the baseplate. The vehicle is lowered back to the ground and the baseplate lifted off the ground by pumping hydraulic fluid into the lower portion of the lift cylinders 16 and 17. As the baseplate is lifted off the ground it is suspended from the hold-down plate by means of a plurality of chains 26. Guide rods 12a and 12b (see FIGS. 1 and 4), slide through the cylindrical bores in guide frames 9A and 9B (9A is now shown) which are rigidly affixed to opposite sides of the transport vehicle.

Because air bags 33a, 33b, 33c and 33d have little resistance to lateral stress, it is necessary to restrain horizontal movement of the hold-down plate and as such maintain the vehicle in alignment with the baseplate so that the weight of the vehicle is substantially centered on the baseplate. This stabilizing or alignment means must not interfere with or detract from to any appreciable extent, the desired vibratory motion of the baseplate.

Figure 2:
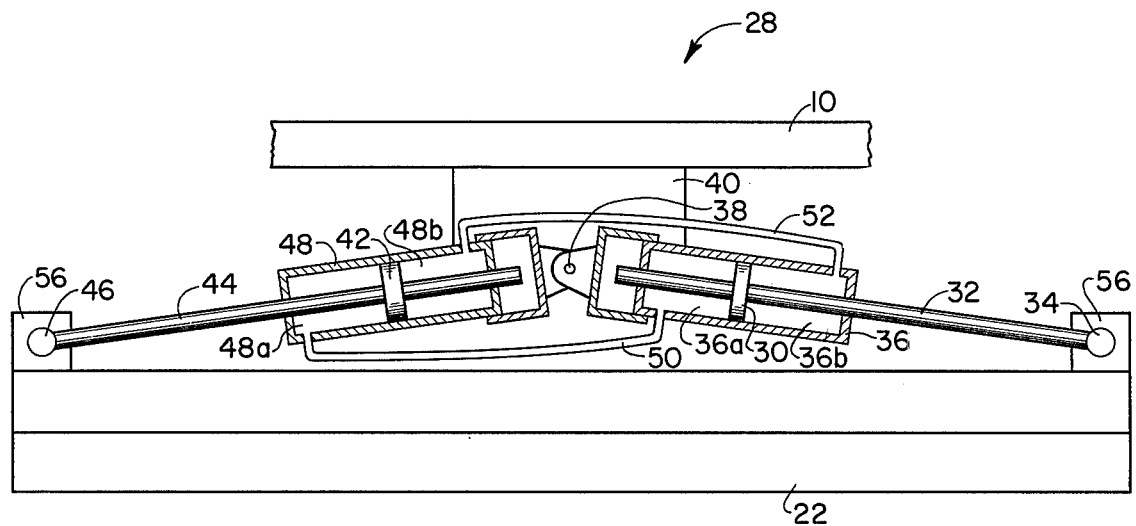
FIG. 2 is a cross-section illustrating the stabilizing means for a vibrator.

The alignment means is shown most perspicuously in FIGS. 1 and 2, and is comprised of a plurality of opposed piston-cylinder pairs 28 mounted between baseplate 22 and hold-down plate 10. Each pair includes a piston 30 having a piston rod 32 connected by means of a ball joint 34 or other suitable pivotal connecting means to mounting assembly 56 which is affixed to a corner of the baseplate. Piston 30 is mounted within hydraulic cylinder 36, which is pivotally connected by means of a ball joint 38 or other suitable pivotal connecting means to plate 40 which extends downwardly from the hold-down plate. Each piston-cylinder pair further includes a second piston 42 having a piston rod 44 connected by means of a ball joint 46 or other suitable pivotal connecting means to mounting assembly 56 which is affixed to a corner of the baseplate. Piston 42 is mounted within hydraulic cylinder 48, which is also pivotally connected by means of ball joint 38 or other suitable pivotal connecting means to plate 40. One of these opposed piston-cylinder pairs is fixed to each side of the vibrator baseplate.

Piston 30 divides the cylinder 36 into a first chamber 36a and a second chamber 36b. Piston 42 divides the cylinder 48 into a first chamber 48a and a second chamber 40b. Chamber 48a of cylinder 48 is connected to chamber 36a of cylinder 36 by means of a fluid conduit 50. Similarly, chamber 48b of cylinder 48 is in fluid communication, through conduit 52, with chamber 36b of cylinder 36. The cylinders 36 and 48, and the conduits 50 and 52 contain suitable hydraulic fluid, such as Dexron II, therein, which serves as a dampening medium to isolate undesirable horizontal vibrations of the baseplate 22 from hold-down plate 10.

As stated above, reciprocating motion of the power piston is transferred to baseplate 22 by the piston rod. As the baseplate moves downward with respect to hold-down plate 10, piston 42 will move to the left and piston 30 will move to the right. Hydraulic fluid will be forced from chambers 48a and 36b through conduits 50 and 52, respectively, and into chambers 36a and 48b. As the baseplate is moved upward the flow of hydraulic fluid will be reversed. It can be seen from FIG. 2 that baseplate 22 will remain centered beneath hold-down plate 10 during reciprocating movement of the baseplate, that is horizontal motion between the baseplate and the support structure is inhibited.

During operation of the vibrator, forces acting on the baseplate are applied through ball joints 34 and 46, to piston rods 32 and 44, respectively. With reference to FIG. 2, a horizontal force exerted on piston rod 32 attempting to move piston 30 with respect to cylinder 36 will also tend to move piston 42 with respect to cylinder 48. Similarly, a horizontal force exerted on piston rod 44 attempting to move piston 42 with respect to cylinder 48 will also tend to move piston 30 with respect to cylinder 36. For example, a force exerted on piston rod 32 to the left will tend to move piston 30 to the left with respect to cylinder 36. This will force hydraulic fluid from chamber 36a through conduit 50 and into chamber 48a, which tends to force piston 42 to the right with respect to cylinder 48. Transfer of forces in this manner maintains the baseplate in its centered position beneath the hold-down plate. Thus on contacting the earth's surface, the baseplate is maintained in vertical alignment with the hold-down plate and the weight of the vehicle is applied substantially to the center of the baseplate.

The hydraulic fluid in cylinders 36 and 48 also functions as a dampening medium to isolate vibratory baseplate motion from the hold-down plate and the transport vehicle. The hydraulic fluid is somewhat compressible and, therefore, functions mechanically as a spring. The stiffness (or compliance) of this spring can be varied by changing the geometry of the piston-cylinder assembly. Increasing the diameter or decreasing the length of a cylinder will increase the stiffness; whereas, decreasing the diameter or increasing the length of a cylinder decreases the stiffness. The vibration dampening characteristic as a function of frequency can be selected by selecting an appropriate piston-cylinder geometry. Dynamic characteristics of typical hydraulic fluids are well known to those of ordinary skill in the art.

The pivotal connections of the alignment system described herein also permit the baseplate to tilt, if the baseplate is on ground that is not in parallel alignment with the plane of the vehicle, thus permitting the baseplate to rest evenly on the ground.

Figure 3:
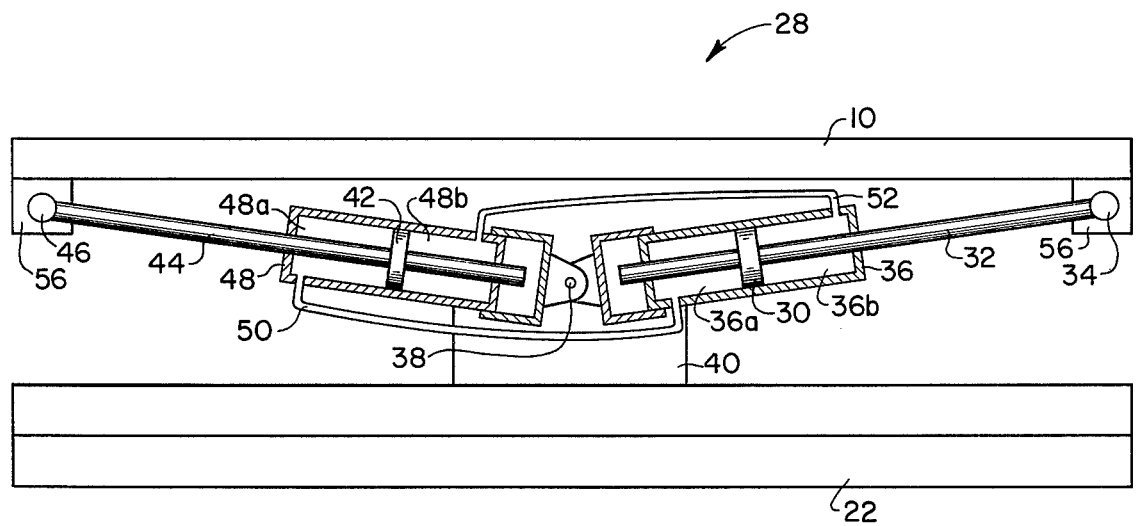
FIG. 3 is a cross-section illustrating an alternate configuration for the stabilizing means.

In a preferred embodiment shown in FIG. 1, cylinders 48 and 36 of the hydraulic stabilization system are pivotally attached to the hold-down plate, while the piston rods 44 and 32 are pivotally attached to the baseplate. Alternatively, the cylinders may be pivotally attached to the baseplate, in the center thereof, and the piston rods may be pivotally attached to the hold-down plate. FIG. 3 illustrates the arrangement of this alternate embodiment.

Figure 5:
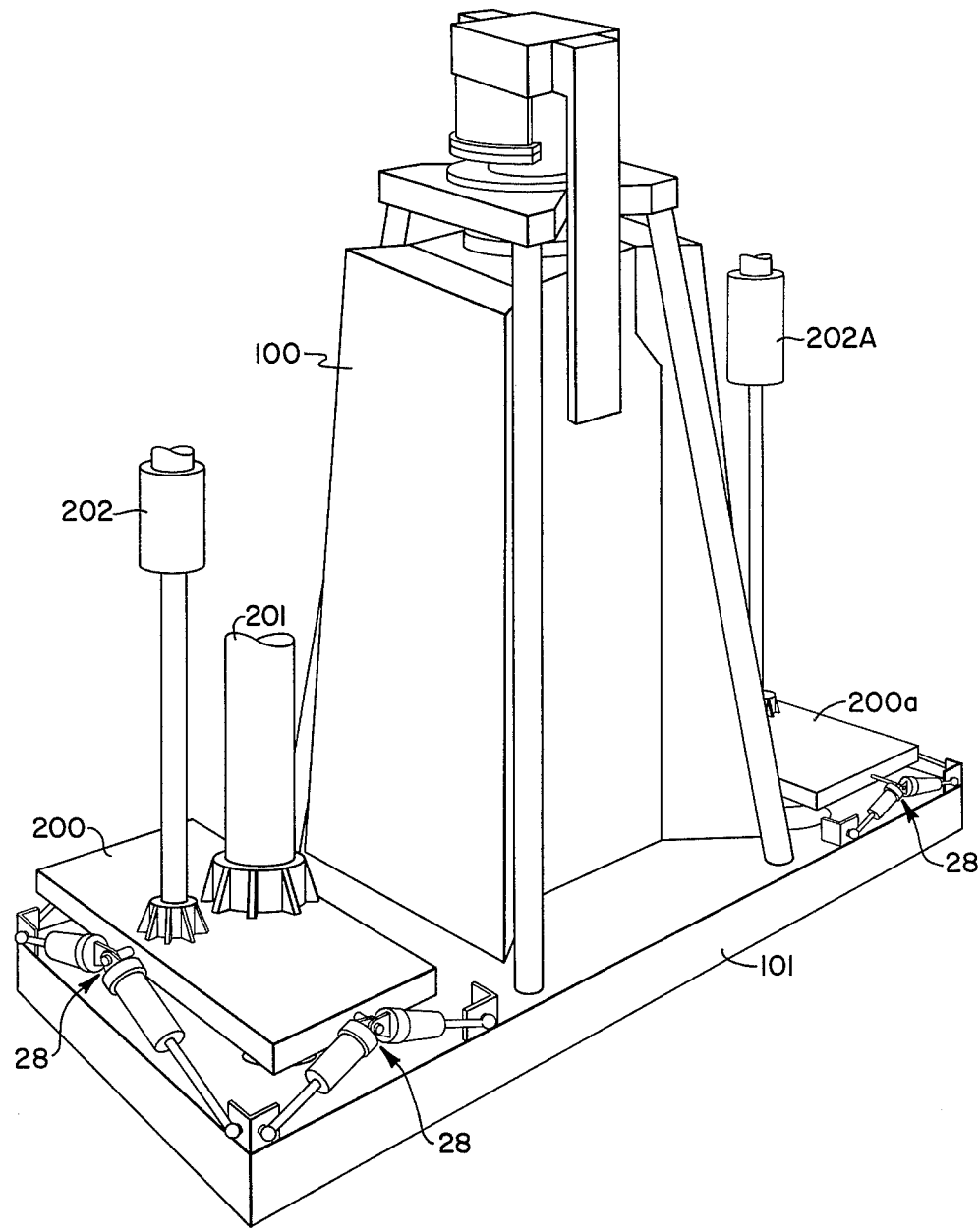
FIG. 5 is a perspective view of a vibrator having a different configuration.

The hydraulic stabilization system of this invention may also be used for the vibrator configuration shown in FIG. 5. There the baseplate 101 extends outwardly from the vibrator, and vertical guide rods 201 and 201A (201A is not shown) and hydraulic lift cylinders 202 and 202A extend from the vehicle frame to footpieces 200 and 200a, which extend outwardly above the baseplate 101. The weight of the vibrator transport vehicle is applied to the baseplate through the footpieces 200 and 200a. The hydraulic stabilization system is similar to that discussed above and shown in FIG. 2 except that the opposed piston pairs 28 are mounted between footpieces 200 and 200a and the baseplate 101. Further, the opposed piston pairs need be mounted only on three sides of each footpiece. It is not necessary that there be an opposed piston pair mounted on the side of the footpiece adjacent to the reaction mass 100. The stabilization system could also be mounted as shown in FIG. 3.

Additionally, with reference to the configuration shown in FIGS. 2 and 3, the piston rods may be pivotally attached in the center of the hold-down plate or footpieces, and the cylinders may be pivotally attached to the baseplate. The piston rods may also be pivotally attached to the baseplate, in the center thereof, while the cylinders are pivotally attached to the hold-down plate or footpieces.

The foregoing disclosure and description of the present invention is illustrative and explanatory thereof and various changes in the size, shape and materials as well as in the details of the preferred embodiment may be made without departing from the spirit and scope of the invention.

What I claim is:

1. In a vibratory seismic energy source adapted to be transported on a vehicle, including a vertically disposed piston and cylinder assembly, a piston rod extending downward from said piston and connected at its lower end to a baseplate, a weight-bearing member positioned above said baseplate, means for applying at least a portion of the weight of said vehicle to said weight-bearing member and elastic means for coupling substantially vertical forces from said weight-bearing member to said baseplate, the improvement comprising:

a hydraulic stabilizing means extending between said weight-bearing member and said baseplate for interconnecting said weight-bearing member and said baseplate in order to limit horizontal movement of said baseplate relative to said weight-bearing member and to isolate vibratory motions of said baseplate from said weight-bearing member, said stabilizing means being hydraulically interconnected to permit vertical motion of said baseplate relative to said weight-bearing member.

2. In a vibratory seismic energy source wherein seismic energy is coupled to the ground by means of a baseplate and wherein the weight of a heavy mass is applied to said baseplate through a support structure, an improved stabilizing means for maintaining vertical alignment between said baseplate and said support structure and for isolating baseplate vibrations from said support structure, which comprises:

a plurality of pairs of resilient elements comprising first and second piston-cylinder assemblies, each piston-cylinder assembly having one end thereof pivotally connected to said support structure and having the other end pivotally connected to said baseplate, and the two points of connection of said piston-cylinder assemblies to either said baseplate or to said support structure are spaced substantially further apart than the other points of connection, said piston-cylinder assemblies having hydraulic interconnections therebetween which permit contractions and extensions of said piston-cylinder assemblies to enable vertical motion of said baseplate relative to said weight-bearing member.

3. The apparatus of claim 2 wherein the piston rods connected to said pistons are connected to said baseplate and said cylinders are connected to said support structure and the connection points of said piston rods are spaced substantially further apart than the connection points of said cylinders and said pistons define first upper and second lower chambers within each cylinder and the first chamber of the first cylinder is in fluid communication with the second chamber of the second cylinder and the second chamber of the first cylinder is in fluid communication with the first chamber of the second cylinder.

4. The apparatus of claim 2 wherein the piston rods connected to said pistons are connected to said support structure and said cylinders are connected to said baseplate and the connection points of said piston rods are spaced substantially further apart than the connection points of said cylinders and said pistons define upper and second lower chambers within each cylinder and the first chamber of the first cylinder is in fluid communication with the second chamber of the second cylinder and the second chamber of the first cylinder is in fluid communication with the first chamber of the second cylinder.

5. The apparatus of claim 2 wherein the piston rods connected to said pistons are connected to said support structure and said cylinders are connected to said baseplate and the connection points of said cylinders are spaced substantially further apart than the connection points of said piston rods and said pistons define first upper and second lower chambers within each cylinder and the first chamber of the first cylinder is in fluid communication with the second chamber of the second cylinder and the second chamber of the first cylinder is in fluid communication with the first chamber of the second cylinder.

6. The apparatus of claim 2 wherein the piston rods connected to said pistons are connected to said baseplate, and said cylinders are connected to said support structure and the connection points of said cylinders are spaced substantially further apart than the connection points of said piston rods and said pistons define first upper and second lower chambers within each cylinder and the first chamber of the first cylinder is in fluid communication with the second chamber of the second cylinder and the second chamber of the first cylinder is in fluid communication with the first chamber of the second cylinder.

7. The apparatus of claim 2 wherein each said piston-cylinder assembly comprises a piston having a piston rod connected thereto and each said piston defines a first upper and second lower chambers within each cylinder and the first chamber of the first cylinder is in fluid communication with the second chamber of the second cylinder and the second chamber of the first cylinder is in fluid communication with the first chamber of the second cylinder.

8. The apparatus of claim 7 wherein said stabilizing means comprises a plurality of said pairs of resilient elements.

9. The apparatus of claim 7 wherein said support structure comprises a hold-down plate and said baseplate is substantially rectangular, and said stabilizing means comprises four pairs of said resilient elements, one pair being connected to each side of said baseplate.

10. The apparatus of claim 7 wherein said support structure comprises two footpieces and said stabilizing means comprise at least six of said pairs of resilient elements.

11. In a vibratory seismic energy source which couples seismic energy to the ground by means of a baseplate and wherein a portion of the weight of a heavy mass is supported on a support structure and said weight is applied to the baseplate through spring means, the improvement which comprises means for restraining horizontal motion between said baseplate and said support structure which permits vertical motion of said baseplate with respect to said support structure which comprises:
   a first pair of elongated members pivotally connected to said baseplate;
   a second pair of elongated members pivotally connected to said support structure;
   means for hydraulically interconnecting said first pair of elongated members and said second pair of elongated members to enable vertical motion of said baseplate with respect to said support structure; and
   the points of pivotal connection of said pairs of elongated members to either said support structure or said baseplate are spaced substantially further apart than the other points of pivotal connection of said elongated members.

12. The apparatus of claim 11 wherein said first pair of elongated member comprises a pair of pistons and piston rods and said second pair of elongated members comprises a pair of cylinders.

13. The apparatus of claim 12 wherein each said piston defines within a cylinder a first chamber in the end of the cylinder adjacent said support structure and a second chamber in the end of the cylinder adjacent said baseplate, and further including means for providing fluid communication between the first chamber of the first cylinder and the second chamber of the second cylinder and means for providing fluid communication between the first chamber of said second cylinder and the second chamber of said first cylinder.

14. In a vibratory seismic energy source which couples seismic energy to the ground by means of a baseplate and wherein a potion of the weight of a heavy mass is supported on a support structure and said weight is applied to the baseplate through spring means, the improvement comprising means extending between said support structure and said baseplate for interconnecting said support structure with said baseplate which permits vertical motion therebetween and prevents substantial horizontal motion therebetween in which forces are transmitted between said baseplate and said support structure through fluid means thereby isolating vibrations of said baseplate from said support structure.

15. In a vibratory seismic energy source wherein energy is coupled to the ground by means of a baseplate and wherein the weight of a heavy mass is applied to said baseplate through a support structure, an improved stabilizing means for maintaining vertical alignment between said baseplate and said support structure and for isolating baseplate vibrations from said support structure, which comprises:
   a plurality of pairs of piston-cylinder assemblies, each pair of piston-cylinder assemblies comprising first and second piston-cylinder assemblies, each said first and second piston-cylinder assembly having one end thereof pivotally connected to said support structure and having the other end pivotally connected to said baseplate, and the two points of connection of each said first and second piston-cylinder assembly to either said baseplate or to said support structure being spaces substantially further apart than the other points of connection so that the two piston-cylinder assemblies comprising each pair of piston-cylinder assemblies are in opposed relationship.

* * * * *